3,567,720
PROCESS FOR IMPROVING THE STORAGE STABILITY OF 2-(MORPHOLINOTHIO)-BENZOTHIAZOLE
Albert F. Hardman, 1759 Smith Road, Akron, Ohio 44313
No Drawing. Filed June 21, 1968, Ser. No. 738,778
Int. Cl. C07d 87/46
U.S. Cl. 260—247.1                                      13 Claims

ABSTRACT OF THE DISCLOSURE

Actively contacting a liquid form of an impure 2-(morpholinothio)-benzothiazole product with a gaseous material to improve the storage stability of the 2-(morpholinothio)-benzothiazole.

---

This invention relates to a process for increasing the storage stability of 2-(morpholinothio)-benzothiazole.

The use of some accelerators in sulfur type vulcanization systems is limited, due to their tendency to cause premature vulcanization while the rubber is being processed at high temperatures. This premature vulcanization is commonly known as scorch. It is undesirable primarily because it results in shortening the flow period necessary to enable the rubber stock to completely fill a mold. One of the principal advantages of sulfenamide accelerators over this type of accelerator is the superior scorch resistance offered by the sulfenamide accelerators during processing. However, sulfenamide accelerators often possess poor storage stability, also commonly known as poor shelf life. That is, they tend to slowly decompose during storage to form accelerators which possess poor scorch resistance. Therefore, the use of a sulfenamide containing such products of decomposition tends to cancel out the good scorch resistance properties of the sulfenamide. 2-(morpholinothio)-benzothiazole is such a sulfenamide, possessing good scorch resistance, but poor storage stability. It is therefore desirable that a simple inexpensive process be provided for increasing the shelf life of 2-(morpholinothio)-benzothiazole (MTB).

It is an object of this invention to provide a simple inexpensive process which will increase the shelf life stability of MTB.

The objects of the present invention are accomplished by a process comprising actively contacting at least one liquid form of an impure MTB product with at least one gaseous material.

It has been found that many of the impurities commonly present in commercial sulfenamide products tend to accelerate the decomposition of the sulfenamide. The removal of the volatile impurities from the MTB product appears to be the basis for the improvement provided by the present invention. Therefore, by impure MTB product herein is meant MTB containing impurities, which tend to degrade the MTB during storage. Examples of such impurities are morpholine and water.

By actively contacting is meant that the liquid and gaseous phases are sufficiently intermingled with each other to significantly increase the interface between the two phases.

Any liquid form of the impure MTB product may be used. For example, molten MTB and solutions of MTB in an inert organic solvent such as toluene or benzene may be used. The basic requirement is that the MTB be in liquid form so as to allow the gaseous material to come into active, intimate contact with it. MTB prepared by any of the many well known methods for producing MTB, e.g., the methods described in U.S. Pats. 2,837,519 and 3,281,418, will benefit by the treatment described herein, whenever volatile impurities which tend to degrade the sulfenamide are present.

Any gaseous material may be used within the practice of the present invention. However, the gas must be chemically inert in that it is relatively unreactive with the MTB. In addition, it should be devoid of materials such as water and acidic fumes such as sulfur dioxide, which tend to degrade the MTB. Gaseous materials that may be used in the practice of the present invention include such gases as air, oxygen and nitrogen. Air is particularly preferred because of its availability, inexpensiveness and effectiveness.

The process temperature to be used is partially dependent on the particular liquid form of the MTB being used. Where an inert organic solvent is used, for example, the temperature may vary from about room temperature, i.e., about 25° C., to about 125° C. However, the temperature must be below the boiling point of the solvent. Where the MTB is in the molten state the temperature may vary from the melting point of the MTB to about 125° C. Preferably the upper temperature limit in either case is about 100° C.

The rate of removal of the volatile impurities is dependent on the principles of mass transfer of matter, in this case the transfer of the volatile impurities from the liquid phase to the gaseous phase. Basically then the factors affecting the rate of removal of the volatile impurities include the intimacy of contact between the two phases and the duration of the contact. The intimacy of contact is dependent on the area of the interface between the two phases which in turn is dependent upon the degree of active contact between the liquid and gaseous phases. The rate of removal is also dependent on temperatures. Therefore, as the area of the interface, the temperature and the duration of contact increase, the rate of removal of the volatile impurities also increases. The capacity of the gaseous material to remove the volatile impurities will vary, depending upon the composition of the gaseous material, and its degree of saturation with other matter.

The liquid phase may be contacted with gaseous phase in a variety of ways, the primary purpose being to actively contact the two phases so as to increase the interfacial area between the two phases. Either a continuous or a batch process may be used. As the intimacy of the contact between the two phases increases the contact time necessary to obtain a predetermined rate of removal of the volatile impurities decreases. A particular effective method of actively contacting the phases is obtained by bubbling the gaseous phase through the liquid phase. The liquid phase may also be mechanically agitated in the presence of a gaseous environment. In another method of actively contacting the liquid phase with the gaseous phase, the liquid phase may be atomized and sprayed into a gaseous environment. Preferably conditions are such that the gaseous material containing the volatiles are allowed to escape from the area immediately adjacent to the contact area. It will be noted that the above methods are designed to increase the surface interface between the liquid and gaseous phases.

Optimum process conditions depend upon various factors such as the amount of the MTB product to be treated and the type of gaseous material used. These optimum conditions may be routinely determined by one skilled in the art. It is preferable to treat the MTB as shortly after its preparation as possible since the sulfenamide irreversibly decomposes with time.

The following example is intended to further illustrate, but not limit, the practice of the present invention.

EXAMPLE 1

A sample of commercial 2-(morpholinothio)-benzothiazole was analyzed as follows:

| Components: | Weight percent |
|---|---|
| Sulfenamide | 92.5 |
| Moisture | 0.6 |

The product also contained a small amount of methanol insoluble tar. A sample of the product was divided into five 100 gram portions (A, B, C, D and E). Portion A was untreated. Portion B was melted on a steam bath at 96 to 97° C. and a slow stream of air drawn through the liquid while under a reduced pressure of approximately 20 to 30 millimeters of mercury, for ½ hour. Portion C was melted on a steam bath and stirred gently for seven hours in a closed but unsealed one liter flask, that is, there was a small opening in the flask to allow a small amount of natural circulation. Portion D was melted on a steam bath and stirred gently in an open one liter flask for seven hours while bubbling a slow stream of air through the liquid. Portion E was melted on a steam bath and stirred gently in an open one liter flask for 24 hours while bubbling a slow stream of air through the liquid.

All of the molten portions were poured into dishes where they were allowed to crystallize while stirring. The resulting cakes were broken up and stored in brown bottles with plastic caps. The samples were reanalyzed after approximately nine months storage at room temperature. The results are listed in Table I.

TABLE I

| | Sulfenamide, weight percent | |
|---|---|---|
| | Original analysis | Analysis after nine months |
| Portion: | | |
| A | 92.5 | 66.2 |
| B | 93.5 | 91.0 |
| C | 91.0 | 84.1 |
| D | 92.8 | 90.0 |
| E | 91.8 | 90.0 |

These results indicate that actively contacting air and molten MTB improves the shelf life, i.e., storage stability, of the sulfenamide. The untreated portion A aged very poorly. Portion C, which was treated in a closed but unsealed flask, possessed improved storage stability over the untreated portion A. Portions B, D and E, which were subjected to an even more intimately active contact with the air, showed practically no deterioration whatsoever on aging.

While certain representative embodiments and details have been shown for the purpose of illustrating the invention, it will be apparent to those skilled in this art that various changes and modifications may be made therein without departing from the spirit or scope of the invention.

What I claim is:

1. A process comprising actively intermingling a liquid form of an impure 2-(morpholinothio)-benzothiazole product with a gaseous material to remove impurities therefrom.

2. The process according to claim 1 wherein the 2-(morpholinothio)-benzothiazole product is in molten form.

3. The process according to claim 1 wherein the 2-(morpholinothio)-benzothiazole product is dissolved in an inert organic solvent.

4. The process according to claim 2 wherein the 2-(morpholinothio)-benzothiazole product is at a temperature of from the melting point of the 2-(morpholinothio)-benzothiazole to about 125° C.

5. The process according to claim 3 wherein the 2-(morpholinothio)-benzothiazole solution is at a temperature of from about 25° C. to about 125° C. and wherein the boiling point of the inert organic solvent is greater than the process temperature.

6. The process according to claim 2 wherein the 2-(morpholinothio)-benzothiazole is at a temperature of from the melting point of the 2-(morpholinothio)-benzothiazole to about 100° C.

7. The process according to claim 3 wherein the 2-(morpholinothio)-benzothiazole solution is at a temperature of from about 25° C. to about 100° C. and wherein the boiling point of the inert organic solvent is greater than the process temperature.

8. The process according to claim 1 wherein the gaseous material is at least one material selected from the group consisting of air, oxygen and nitrogen.

9. The process according to claim 1 wherein the gaseous material is air.

10. The process according to claim 1 wherein the liquid from the 2-(morpholinothio)-benzothiazole product is actively intermingled with the gaseous material by bubbling the gaseous material through the liquid form of the 2-(morpholinothio)-benzothiazole.

11. The process according to claim 1 wherein the gaseous material is a material selected from the group consisting of air and oxygen.

12. The process according to claim 1 wherein the liquid form of the 2-(morpholinothio)-benzothiazole product is actively intermingled with the gaseous material by atomizing the liquid and spraying it into the gaseous material.

13. The process according to claim 1 wherein the 2-(morpholinothio)-benzothiazole product is in molten form, the gaseous material is air, the 2-(morpholinothio)-benzothiazole product is at a temperature of from the melting point of the 2-(morpholinothio)-benzothiazole to about 125° C. and the molten form of the 2-(morpholinothio)-benzothiazole product is actively intermingled with the air by bubbling the air through the molten form of the 2-(morpholinothio)-benzothiazole.

No references cited

ALEX MAZEL, Primary Examiner

J. TOVAR, Assistant Examiner

PO-1050
(5/69)

UNITED STATES PATENT OFFICE
CERTIFICATE OF CORRECTION

Patent No. 3,567,720      Dated March 2, 1971

Inventor(s)   Albert F. Hardman

It is certified that error appears in the above-identified patent and that said Letters Patent are hereby corrected as shown below:

In the heading of the patent, after "Albert F. Hardman, Akron, Ohio," insert --assignor to The Goodyear Tire & Rubber Company, Akron, Ohio--.

Claim 8, line 2, "at least one" should be deleted and replaced by --a--.

Claim 10, line 2, "from" should read --form of--.

Signed and sealed this 26th day of October 1971.

(SEAL)
Attest:

EDWARD M. FLETCHER, JR.
Attesting Officer

ROBERT GOTTSCHALK
Acting Commissioner of Pate